United States Patent [19]

Morris et al.

[11] 3,713,593

[45] Jan. 30, 1973

[54] FINE MEDIA MILLING PROCESS

[75] Inventors: Horton Harold Morris, Macon, Ga.; J. Raymond McMahan, Belmont; William I. Rogers, Carlisle, both of Mass.

[73] Assignee: Freeport Sulphur Company, New York, N.Y.

[22] Filed: Aug. 11, 1970

[21] Appl. No.: 63,001

[52] U.S. Cl. ...................... 241/27, 241/30, 241/172, 241/184
[51] Int. Cl. ............................................. B02c 17/16
[58] Field of Search .......... 241/172, 184, 173, 27, 30

[56] References Cited

UNITED STATES PATENTS

| | | | |
|---|---|---|---|
| 3,190,568 | 6/1965 | Freedman et al. | 241/184 X |
| 3,018,059 | 1/1962 | Lodige et al. | 241/172 X |
| 3,131,875 | 5/1964 | Szeguari | 241/172 X |
| 3,199,792 | 8/1965 | Norris, Jr. | 241/172 X |
| 3,291,400 | 12/1966 | Jensen | 241/172 |

Primary Examiner—Granville Y. Custer, Jr.
Attorney—Philip Churchill

[57] ABSTRACT

The invention relates to a process for the fine media milling of microorganisms or crystalline organic materials. In our process, a liquid dispersion of a microorganism or crystalline organic material is agitated in the presence of grinding media.

7 Claims, No Drawings

FINE MEDIA MILLING PROCESS

BACKGROUND OF THE INVENTION

1. Field of the Invention

The present invention is concerned with a novel process for milling microorganisms or solid, crystalline organic material using a specific type of grinding media.

2. Description of the Prior Art

There are numerous published processes for the rupturing or milling of organic materials. These methods generally involve grinding in any of a variety of mills and can encompass supersonic disintegration, and the sudden release of high pressure. Curran and Evans, *J. Bact.*, 43, 125 (1942) and Mickle, *J. Roy. Microscope. Soc.*, 68, 10 (1948) have disclosed a process involving agitation of microorganisms in the presence of small glass beads.

Disadvantages exist in prior art processes. Thus, they normally involve specially designed or expensive equipment, or are limited to dilute suspensions or to small volumes, or require long periods of operation, or require suspensions or slurries of a specific viscosity range. Other disadvantages are the production of undesirable finely divided cell-wall debris and the formation of particles having a wide and random particle size range. Moreover, although some microorganisms, such as *Escherichia coli*, have been relatively easily ruptured by a number of conventional chemical and physical techniques, some of the biochemical products within the cells of the microorganisms are easily destroyed by thermal and/or chemical degradation that results from the cell-rupturing treatment. To avoid such thermolytic or hydrolytic degradation, biochemists have developed a number of detailed laboratory-scale techniques employing some sort of physical maceration, usually in liquids at temperatures below 0° C. It would be highly desirable to have a simple, efficient process for readily obtaining biochemical products existing within the cells of microorganisms without fear for their thermal or chemical degradation during the process.

It is highly desirable to have a process also for comminution of particulate solids to a specific size range. For example, the comminution of the difficulty soluble procaine penicillin G to a maximum diameter of 2-3 microns has considerable commercial significance. Thus such comminution permits the use of procaine penicillin G as a parenterally administered medication by injection through a hypodermic needle. Typical comminution systems tend to produce a particle-size distribution over a wide particle-size range. By skillful control of nucleation and crystal growth, a narrow range of particle size can sometimes be achieved, but the crystal habit is not always easily controlled, even if the desirable size range is attained.

SUMMARY OF THE INVENTION

It is an object of our invention to provide an inexpensive, economical, durable, convenient and simple process for milling microorganisms or crystalline organic material.

It is yet another object of our invention to provide a milling process for microorganisms or crystalline organic material which process is easily adaptable to continuous operation on a relatively large scale.

Another object of our invention is to provide a milling process for microorganisms or for crystalline organic material which can impart the desirable conditions of high hydrodynamic shear simultaneously to a large proportion of a large volume of the suspended material without undesirably altering other system properties of viscosity, controllable temperature and ambient pressure.

It is a further object of our invention to provide an efficient milling process for microorganisms or crystalline organic material which allows for extraordinary economies of time, space and energy.

Yet another object of our invention is to provide a milling process for microorganisms or crystalline organic material which permits a wide latitude of choice of the starting medium.

Another object of our invention is to provide a process for the obtainment, in good yield, of chemically and thermally vulnerable products, such as enzymes or other equally delicate chemical materials, present as the intracellular composition of microorganisms.

Still another object of our invention is to provide a process for the production of particulate material having a narrow size distribution by the comminution of larger particles of crystalline solids.

It is a further object of our invention to provide an efficient and simple process for extracting biochemical products that exist within the cells of microorganisms without exposing them to the risk of thermal and/or chemical degradation.

Another object of our invention is to provide an efficient process for rupturing the cell walls of microorganisms.

Yet a further object of our invention is to furnish a process for efficiently obtaining enzymes and other organic materials locked within the cells of microorganisms without a fear of thermal or chemical degradation of the enzymes or other organic material during the process.

Another object of our invention is to provide an efficient process for milling organic material to a particle size finer than 325 mesh and generally finer than 15 microns while avoiding the reduction of particle size beyond a desirable minimum of 1-2 microns.

A further object of our invention is to provide a process which results in the application of a fluid mechanical force in such a way as to rupture cell walls of microorganisms but avoiding the production of undesirable finely divided cell-wall debris.

An additional object of our invention is to provide a process for the comminution of particulate crystalline solids.

Another object of our invention is to provide a process for crushing crystalline solids until the solids have attained a maximum diameter of 2-3 microns.

A further object of our invention is to provide a process for bursting the cell wall of microorganisms so that the contents within the microorganisms can be leached out while minimizing the production of finely divided cell debris.

Another object of our invention is to provide a milling process which permits stabilization and control of temperature within desirable limits.

Other objects and advantages of our invention will be apparent to those skilled in the art from the following description and examples.

We have found that the foregoing objectives are obtained by subjecting, in a batch or continuous operation, a liquid mixture of a microorganism or crystalline organic solid material to agitation in the presence of fine grinding media. After the agitation, the suspension from the milling is ready for use. In a batch operation, a siphoning method can be used to obtain the milled suspension because the density of the milling media is generally different from that of a suspending liquid, the two phases separating spontaneously and cleanly when the milling is stopped. In a continuous operation, a continuous filtration or centrifugation to separate the grinding media from the suspension can be used.

The grinding media employed in our process should be nonreactive with the microorganism or crystalline organic material under the processing conditions and not melt below about 100° C. The media should be of a synthetic or natural plastic. It may be in the form of cylinders, pellets or preferably beads.

The grinding media should be smaller than one-quarter inch in overall diameter, i.e., smaller than about 3 mesh (Tyler) in overall diameter, and preferably smaller than 0.15 inch in overall diameter. The grinding media should also be larger than 400 mesh in overall diameter, advantageously larger than 200 mesh in overall diameter. Preferably the grinding media has a 10-60 mesh size. The grinding media also should have a specific gravity not greater than 2.0 and a Rockwell Hardness test value less than D-100.

It is advantageous that the grinding media be resistant to wear during milling and have a low specific gravity. In this environment, less power is required for the agitation.

When the grinding media is not larger than 400 mesh in overall diameter, there is difficulty in removing the grinding media from the milled mixture. When the media is not smaller than one-quarter inch in overall diameter, it is difficult, if not impossible, to achieve our objectives.

The grinding media generally comprise 30-70 volume percent of the total mixture, preferably around 50 volume percent of the total mixture.

The synthetic plastic of applicants' grinding media may be the synthetic high molecular weight materials produced either by addition or condensation polymerization and having a specific gravity not greater than 2.0 and a Rockwell Hardness test value less than D-100. An important class of plastics for the media are those obtained from a polymerizable monomer having a carbon-carbon double bond. Such polymers include those formed from monomers such as ethylene, propylene, and isobutylene, butadiene, isoprene, tetrachloroethylene, chlorotrifluoroethylene, vinyl acetate, vinyl alcohol, vinyl butyral, vinyl carbazole, vinyl chloride, vinylidene chloride, styrene, alphamethylstyrene, acrylic acid, methacrylic acid, methyl acrylate, ethyl acrylate, methyl methacrylate, ethyl methacrylate, and acrylonitrile.

Other applicable resins for the grinding media are the cellulose derivatives, e.g., cellulose esters such as cellulose acetate, cellulose triacetate, cellulose acetatebutyrate, and cellulose propionate, and cellulose ethers such as methyl or ethyl cellulose, cellulose nitrate, rayon, and the like.

Acetal resins form another group of suitable grinding media resins. This class comprises those resins formed by the addition polymerization of formaldehyde or higher aldehydes to produce an oxymethylene or substituted oxymethylene linkage.

Resins formed by the condensation of an aldehyde with other materials can also be used in applicants' process as the grinding media. Typical resins are the phenolics, formed by the condensation of phenol, cresol, xylenol, or other hydroxy aromatic compounds with formaldehyde or other higher aldehydes; the melamine resins, formed by the condensation of melamine and formaldehyde or higher aldehydes; and resins formed by the condensation of urea with formaldehyde or higher aldehydes.

Other applicable resins include the furan resins obtained by the polymerization of furfural or furfuryl alcohol, and by copolymerization of furfural and a ketone; coumarone-indene resins; silicone elastomers; polycarbonate resins formed by polymerization of unsaturated cyclic esters of carbonic acid such as vinylidene carbonate and allyldiglycol carbonate or by condensation of phosgene with a diol; epoxy resins formed by condensation of a halogenated alkylene oxide such as epichlorohydrin with a polyhydric compound such as ethylene glycol or bis-phenol.

A further class of suitable resins for the grinding media are the polyesters. These resins are formed by reaction of a polyhydric alcohol with a saturated or unsaturated polycarboxylic acid, acid anhydride, or acyl halide and include the polyesters formed from an unsaturated acid and an alkylene glycol or dialkylene glycol, which products are subsequently crosslinked by further reaction with a compound containing

group such as styrene, ethyl acrylate, methyl methacrylate, acrylonitrile, vinyl acetate, or acrolein.

Another class of resins are the polyurethane resins prepared by reaction of polyols, or polyesters containing free or terminal hydroxyl groups, with a multifunctional isocyanate such as tolylenediisocyanate. Other suitable resins for the grinding media are the polyamides produced by the condensation of a diamine with a dicarboxylic acid, or by the addition polymerization of cyclic amides, or by some other method. The polyamides include the nylons, such as nylon 6 (from epsilon-caprolactam) and nylon 66 (from hexamethylenediamine and adipic acid).

Another related group of resins include the copolymers and terpolymers of the above groups. Examples include polymerized butadiene/styrene, vinyl chloride/vinyl acetate, ethylene/maleic anhydride and butadiene/styrene/vinylbenzene.

Preferred plastics for the grinding media are nylon, styrene-divinyl benzene copolymers, polystyrene, polyvinyl chloride, polyethylene, polypropylene and ABS (acrylonitrile-butadiene-styrene terpolymer).

In our process an infinite variety of microorganisms can be used. The particular microorganism employed is not critical. Thus, microorganisms with a wide range of physical properties (size, shape, resiliency and temperature-sensitivity) can be subjected to our novel comminution or fine-media milling process. Moreover microorganisms, such as *Candida utilis* (commonly called *Torula* yeast or *Torula utilis*) that has been grown on sulfite waste liquor, which have always presented the greatest difficulties to mechanical disruption techniques, can be readily ruptured through our process, thus affording a good yield of proteins. *Torula utilis* is grown primarily for use as an ingredient of animal feeds because of its high protein content. However, the difficulty of separating the tough cellulosic cell-wall material of the *Torula utilis* from the desirable proteins in the *Torula utilis* has restricted its use to feed-stock for ruminant mammals.

Applicable microorganisms for our process are not limited to any specific family or genus. Thus strains can be isolated from fungi, yeasts, actinomycetes and bacteria. Strains of *Bacillus subtilis*, *Escherichia coli*, *Micrococcus glutamicus*, *Bacillus megaterium-Bacillus cereus* intermediate types, *Brevibacterium divaricatum*, *Brevibacterium ammoniagenes*, *Arthrobacter globiformis*, *Bacillus megaterium*, *Brevibacterium alanicum*, *Brevibacterium lactofermentum* and the like can be used.

Our process is applicable to any organic crystalline solid material which does not melt below about 100° C and is friable under the milling conditions of our process. Merely illustrative compounds are N-tolylacetamide, acetophenone phenylhydrazone, acetylbiuret, acetyl-α-bromo-α-ethylbutyryl-urea, acridine, amarine, para-aminoacetophenone, amino-2-azo-5-anisole, aminobenzamide, pyrene, ninhydrin, 2,4,6-triiodophenol, benzoic acid, phenobarbital, panthesin, novocain, 3-nitro-4-aminophenol, 1,8-naphthosulfone, methylguanidine nitrate, 2-methylbenzimidazole, thiosemicarbazide, metaphenylbenzoic acid and xanthone.

In our process, the microorganism or organic crystalline material is dispersed in a liquid. The liquid can be water or an aqueous solution such as generally used as a microorganism's culture field, or a judiciously chosen inert organic liquid can be employed as the suspending medium. For use in milling crystalline substances, the liquid must be a virtual non-solvent. For the direct extraction of intracellular constituents from within the cells of a microorganism, the liquid must be a good solvent but not injurious to the extracted matter. In general, the proportions of water or organic solvent to microorganism or crystalline organic material are not critical, since the water or organic solvent functions merely as a suspending medium for the dispersed material. However, other factors affecting the integrity of the product or the efficiency of extraction may dictate these proportions in specific cases.

The degree of agitation to be employed in our process will vary widely, depending upon the size and shape of the milling container, and also upon the type of agitating device, e.g., the design and pitch of the blades. The agitation also may be carried out by stirring, tumbling, shaking, rocking and the like. Degree of agitation and length of agitation are a function of the material being treated and the extent to disruption desired. Both can vary depending upon the end use of the product.

In general, the temperature for our process is not critical, and, accordingly, can vary over a wide range. The temperature can be dependent on the material undergoing the treatment. An upper limit of 40° C is tolerable to most microorganisms and enzymes that are associated with animal systems, but for other microorganisms the temperature limits may be higher or lower. The temperature of our process should be such as to not cause thermal degradation of the desired products. The physical effect of the milling is generally not affected by temperature insofar as the physical characteristics of the materials (viscosity of the liquid, density of the liquid, rigidity or brittleness of the solids, etc.) are not affected significantly by temperature. Moreover, as temperature may affect solubility or chemical stability of the obtained materials, an advantage of our system is that it permits stabilization and control of temperature within desirable limits.

The following examples are given to aid in understanding the invention. It is to be understood that the invention is not restricted to the specific compositions or conditions given in the Examples. Said Examples are rather only illustrative and should not be construed as limiting the invention which is properly delineated in the appended claims.

EXAMPLE 1 a. A small-scale experimental milling apparatus was constructed by mounting a 14-liter (5⅓-gallon) New Brunswick fermentor on a floor-mounted drill-press. The fermentor consisted essentially of a cylindrical glass tank, 8½ inches in diameter, open at the top, and covered by a gasketed stainless steel plate through which the shaft of a paddle wheel assembly projects. Twelve rectangular paddle-blades were attached to the shaft in two sets of six, each in a horizontal plane, one at 3½ inches and the other at 6 inches from the bottom of the tank. Each paddle-wheel was about 5 inches in diameter, and each paddle-blade is a 1** × 1½ inches rectangle slanted at an angle of 30° from the horizontal. The blades in the upper set were slanted so as to drive the liquid contents downward, and those in the lower set were slanted oppositely. Four vertical stator strips, three-fourths inch wide, were oriented radially and spaced equally around the periphery of the paddle wheels, allowing about ⅜ inch clearance at the ends of the blades.

The drill-press for driving the paddle-wheel was powered by a ½-H.P. electric motor. A V-belt on a pair of four-step pulleys permitted no-load shaft speeds of 650, 1,350, 2,350 and 5,000 rpm; and the paddle-wheel shaft was held directly in the three-jaw chuck of the drill-press.

A 10 percent suspension of coarse crystalline procaine penicillin G having a particle size range extending upwards to 50–100 microns and which is prismatic or needle-like in habit was made up in distilled water, and an equal volume of styrene-divinyl benzene copolymer beads (18–56 mesh) (2.5 liters) was added to make a total volume of 5 liters. The mixture was added to the fermentor and the impeller was operated at 1,350 rpm for six successive 10-minute periods, and then for two periods of 15 minutes and 60 minutes each at 2,350 rpm. A very substantial degree of comminution was achieved in the first 10-minute treatment. Thereafter a gradual decrease occurred in the number of particles larger than 3 microns, until at the end of the first hour a highly uniform size range of 2–3 microns was achieved. Virtually no particles of 0.5–1.0 microns were observed at any time. Thus, the production of ultra-fine fractions was avoided. The resulting particles were also roughly equant in shape, having no dimension substantially different from the other two. The equant shape is highly desirable for enhancement of free-flowing and non-clogging character. Moreover, this demonstrated ability to produce by comminution a narrow particle-size distribution similar to that achieved by controlled crystallization is a most unusual property, and provides many advantages in the industrial production of solid microcrystalline chemicals.

b. A control run was performed as in Example 1 (a) but in which no styrene-divinylbenzene beads were used. Although the mill was operated at full speed for over an hour, no substantial comminution effect was observed.

EXAMPLE 2

Example 1 (a) was repeated but with the substitution of styrene-divinyl benzene copolymer beads of 40–60 mesh for the beads set out in Example 1(a). At the end of 1¼-hour period of milling at 2,350 rpm, a microscopic examination was made of several samples withdrawn from the suspension. The result of this test was that the average size of the milled crystals averaged about 1–2 microns.

EXAMPLE 3

An aqueous suspension of *Escherichia coli* was prepared containing $1.7 \times 10^9$ cells per ml. Three liters of this suspension were placed in the milling apparatus of Example 1(a), together with 3 liters (displacement volume) of beads of the same kind as used in Example 1(a). The mill was set to turn at 2,350 rpm and was allowed to run for 17 minutes, by which time the temperature of the contents had risen gradually to 40° C.

A variety of assays were then performed on the milled media. These included:
1. Optical microscopic examination of samples of the suspension before and after milling;
2. Cell cultures followed by plate counts to determine the fraction of cells killed by the milling;
3. Measurement of optical absorbance of the suspension at 280 nanometers (nm) to determine the concentration of dissolved proteins in the liquid phase; and
4. Determination of concentration of two different enzymes known to be present in *E. coli*: phosphomonoesterase and phosphodiesterase.

Optical microscopic examination at 500×, using oil-immersion optics and phase-contrast illumination showed very marked impoverishment of visible cell population at the end of the milling experiment. Rough visual assays of cell population done at several intervals throughout the experiment showed a fairly steady decrease in the number of apparently intact cells remaining at each interval.

Aliquot samples of the suspension were taken for cell culturing on Eosin/Methylene-Blue agar prior to milling, and again after milling (as well as from a sample of the suspension that had been carried as a non-milled control). Plate counts on the resulting cultures gave the following results:

| | |
|---|---|
| Original suspension: | $1.5 \times 10^9$ cells/ml |
| Un-milled control: | $1.7 \times 10^9$ cells/ml |
| Milled control: | $7.5 \times 10^7$ cells/ml |
| Fraction killed by milling: | 95.6% |

The optical density of the supernatant solutions at 280 nanometers was measured after removal of the solid debris by centrifugation. The density ($E_{280}$) of the milled solution was found to be 1.8 relative to 0.0 for the control, leading to an estimate of 2 mg/ml as the total concentration of dissolved protein in the solution. The good yield of dissolved miscellaneous proteins shows the occurrence of a high degree of cell disruption and release of proteinaceous material from the particulate residue in our process, since the protein content of *E. coli* is largely intracellular and accessible only by rupturing the cell wall.

The two tests for enzymes in the supernate were both negative which can be attributable to thermal denaturation during milling. (Phosphomonoesterase activity was determined by measuring the release of p-nitrophenol from p-nitrophenylphosphate; phosphodiesterase activity was similarly assayed, using p-nitrophenylthymidine-5'-phosphate as the substrate.)

The ability of our process to disrupt bacteria and to extract proteinaceous matter from the bacteria is clearly shown by this Example.

EXAMPLE 4

A 100-gram portion of live baker's yeast (*Saccharomyces cerevisiae*) obtained from Anheuser-Busch, Inc., was suspended in 2.5 liters of water to make a concentration of 40 g/liter, and this was combined with 2.5 liters (displacement volume) of styrene divinyl benzene copolymer beads (18–56 mesh) in the milling apparatus of Example 1(a). The mill was set at 650 rpm. Samples of the suspension were removed at 10-minute intervals for a period of 1 hour, during which time the temperature of the suspension remained between 25° and 27° C. For controlling the temperature, the milling apparatus was equipped with a heat-exchanger consisting of a 19-turn 8 inches-diameter coil of ¼ inch-O.D. stainless steel tubing. This coil fitted snugly against the inner walls of the cylindrical glass tank, and outside the vertical stator blades. Its ends were led up through holes in the cover plate, and were connected by suitable means to a domestic water supply or to a recirculating system that could be maintained at any desired temperature between 0° and 100° by external heating or refrigeration. When examined microscopically at 400× magnification, phase-contrast illumination revealed the original yeast cells as spherical bodies, about 5–10 microns in diameter, whose brightness against the darker field showed them to be intact cells.

At the end of the first 10-minute milling period a remarkable change was evident in the microscopic appearance of the suspension. Relatively few cells retained their original intact appearance, while most of them were shrunken and dark. At the end of 1 hour's milling no intact cells were visible, and although some fine debris had appeared in the background, most of the shrunken (presumably ruptured) cells remained.

A plate count was performed on a sample of the untreated yeast suspension and on a sample of the 1-hour-milled suspension to determine the effectiveness of cell disruption more precisely than by microscopic observation. After 6 days' incubation on Saboraud's agar at 30° C, the control showed a cell concentration of 3.7 ×

$10^8$/ml, while that of the milled sample was only $9.4 \times 10^3$/ml. This indicated a survival of only one out of $4 \times 10^4$ cells. In view of the virtually isothermal character of the process, a good yield of biochemical substances would be expected from subsequent extraction or recrystallization procedures.

EXAMPLE 5

A supply of dried active *Torula utilis* yeast grown on waste sulfite liquor obtained in the north central U.S.A., was rehydrated by suspending it in water at room temperature. When rehydrated, the yeast cells appeared to be intact bean-shaped particles, generally about 2–3 microns wide and 5–7 microns long. Three liters of a 4 percent suspension of *Torula utilis* yeast in water was combined with an equal displacement volume of styrene divinyl benzene copolymer beads (18–56 mesh), and milled in the milling apparatus of Example 4 at 650 rpm for 15 minutes at 25° C, using forced-water cooling to maintain that temperature. No significant change in the microscopic appearance of the cells was evident at the end of that time. The impeller speed was then raised to 1,350 rpm and allowed to run for an additional 20 minutes, during which time the temperature did not exceed 26 C. The impeller speed was increased again to 2,350 rpm, and milling was continued for successive periods of 10 minutes, 30 minutes and 60 minutes. The temperature never exceeded 28° C during the entire process. At the end of the last period very few intact cells were visible.

Samples of the milled suspension and of an untreated control were submitted to the microbiological laboratory for plate culturing, with the following results. The untreated control produced $2.4 \times 10^7$ live cells per ml, while the milled sample produced only $4.4 \times 10^3$ cells per ml, a cell-killing effectiveness of >99.9 percent. Because of the possibility that the cells might have been ruptured by some force other than that produced by the milling, the run was repeated, using a 4 percent suspension of *Torula utilis* yeast in water, but without the beads. The same milling speeds were used for the same periods of time, but no cell disruption occurred. Microscopic examination showed no significant quantities of ruptured cells, and the subsequent plate cultures showed only a slight increase in the live-cell population of the milled sample. Microscopic observation revealed relatively little production of finely divided cell debris. This efficient and chemically innocuous mechanical rupture of the cells provides a highly desirable means of access to the intracellular components.

What is claimed is:

1. Process for comminuting a crystalline organic solid material to particles having a diameter of between 1 and 3 microns which comprises subjecting a liquid mixture of a crystalline organic solid material of a particle size larger than 3 microns in diameter to an agitation in the presence of plastic grinding media, said grinding media being smaller than one-quarter inch in overall diameter and larger than 400 mesh.

2. Process for comminuting crystalline procaine penicillin G particles having a diameter greater than 3 microns to particles having a diameter of between 1 and 3 microns which comprises subjecting a liquid mixture of crystalline procaine penicillin G particles having a diameter greater than 3 microns to an agitation in the presence of plastic grinding media, said grinding media being smaller than one-quarter inch in overall diameter and larger than 400 mesh.

3. Process according to claim 2 wherein the comminuted particles have a diameter of between 2 and 3 microns.

4. Process according to claim 2 wherein the grinding media is smaller than 0.15 inch in overall diameter and larger than 200 mesh in overall diameter.

5. Process for comminuting crystalline procaine penicillin G particles having a diameter greater than 3 microns to particles which are equant in shape and which have a diameter of between 1 and 3 microns, which comprises subjecting a liquid mixture of crystalline procaine penicillin G particles having a diameter greater than 3 microns to an agitation in the presence of plastic grinding media, said grinding media being smaller than one-quarter inch in overall diameter and larger than 400 mesh.

6. Process according to claim 5 wherein the comminuted particles have a diameter of between 2 and 3 microns.

7. Process according to claim 5 wherein the grinding media is smaller than 0.15 inch in overall diameter and larger than 200 mesh in overall diameter.

* * * * *